United States Patent
Li (10) Patent No.: US 10,003,524 B2
(45) Date of Patent: Jun. 19, 2018

(54) ROUTING LOOP DETERMINING METHOD AND DEVICE

(71) Applicant: Huawei Technologies Co., Ltd., Shenzhen (CN)

(72) Inventor: Bin Li, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 141 days.

(21) Appl. No.: 14/949,466

(22) Filed: Nov. 23, 2015

(65) Prior Publication Data

US 2016/0149800 A1 May 26, 2016

(30) Foreign Application Priority Data

Nov. 26, 2014 (CN) .......................... 2014 1 0697434

(51) Int. Cl.
H04L 12/705 (2013.01)
H04L 12/733 (2013.01)
(Continued)

(52) U.S. Cl.
CPC .............. H04L 45/18 (2013.01); H04L 69/16 (2013.01); H04L 69/22 (2013.01); *H04L 45/20* (2013.01); *H04L 45/745* (2013.01)

(58) Field of Classification Search
CPC ......... H04L 45/18; H04L 45/20; H04L 45/66; H04L 45/74; H04L 45/745; H04L 69/16; H04L 69/18; H04L 69/22; H04L 69/325
See application file for complete search history.

(56) References Cited

U.S. PATENT DOCUMENTS 6,501,754 B1 * 12/2002 Ohba .................... H04L 49/309
370/389
6,798,739 B1 * 9/2004 Lee ......................... H04L 45/02
370/216
(Continued)

FOREIGN PATENT DOCUMENTS

CN 101764750 A 6/2010
CN 102594582 A 7/2012

OTHER PUBLICATIONS

Foreign Communication From a Counterpart Application, European Application No. 15195633.1, Extended European Search Report dated Mar. 23, 2016, 6 pages.
(Continued)

*Primary Examiner* — Alpus H Hsu
(74) *Attorney, Agent, or Firm* — Conley Rose, P.C.

(57) ABSTRACT

A routing loop determining method and a device. The method includes: acquiring, by a forwarding device in a layer 3 network, a first packet, where a time to live (TTL) value of the first packet is reduced to 0 by the forwarding device; acquiring, by the forwarding device, a second packet whose destination Internet Protocol IP address is the same as that of the first packet; recording, by the forwarding device, a feature of the second packet; forwarding, by the forwarding device, the second packet; and acquiring, by the forwarding device, a third packet according to the feature of the second packet, where a feature of the third packet is the same as that of the second packet, and determining that a routing loop exists. The present disclosure resolves a problem that a loop in a layer 3 network cannot be detected, and improves accuracy of sending a packet.

13 Claims, 4 Drawing Sheets

(51) Int. Cl.
*H04L 12/741* (2013.01)
*G06F 11/00* (2006.01)
*H04L 29/06* (2006.01)

(56) References Cited

U.S. PATENT DOCUMENTS

| | | | | |
|---|---|---|---|---|
| 6,879,594 B1 * | 4/2005 | Lee | ............... | H04L 12/185 370/389 |
| 7,120,145 B2 * | 10/2006 | Ohba | ............... | H04L 49/309 370/389 |
| 7,533,166 B2 * | 5/2009 | Beyda | ............... | H04L 45/02 709/220 |
| 7,567,547 B2 * | 7/2009 | Mosko | ............... | H04L 45/18 370/231 |
| 7,752,666 B2 * | 7/2010 | Jayawardena | ...... | H04L 43/0847 370/351 |
| 7,953,088 B2 * | 5/2011 | Cheriton | ............... | H04L 45/00 370/392 |
| 7,983,174 B1 * | 7/2011 | Monaghan | ......... | H04L 43/0817 370/242 |
| 8,045,460 B2 * | 10/2011 | Jayawardena | ...... | H04L 43/0847 370/230 |
| 8,125,895 B2 * | 2/2012 | Yasuie | ............... | H04L 12/66 370/229 |
| 8,644,186 B1 * | 2/2014 | Boers | ............... | H04L 45/18 370/254 |
| 8,672,566 B2 * | 3/2014 | Iwao | ............... | H04L 45/18 370/252 |
| 9,288,129 B2 * | 3/2016 | Bush | | |
| 9,369,367 B2 * | 6/2016 | Bush | ............... | H04L 43/10 |
| 2009/0161567 A1 | 6/2009 | Jayawardena et al. | | |
| 2010/0322083 A1 * | 12/2010 | Qiang | ............... | H04L 45/18 370/248 |
| 2013/0322436 A1 | 12/2013 | Wijnands et al. | | |
| 2013/0322444 A1 | 12/2013 | Ossipov | | |
| 2015/0006714 A1 * | 1/2015 | Jain | ............... | H04L 43/026 709/224 |

OTHER PUBLICATIONS

Machine Translation and Abstract of Chinese Publication No. CN101764750, Jun. 30, 2010, 22 pages.
Machine Translation and Abstract of Chinese Publication No. CN102594582, Jul. 18, 2012, 21 pages.
Foreign Communication From a Counterpart Application, Chinese Application No. 201410697434.1, Chinese Office Action dated Mar. 14, 2018, 5 pages.

* cited by examiner

ROUTING LOOP DETERMINING METHOD AND DEVICE

CROSS-REFERENCE TO RELATED APPLICATION

This application claims priority to Chinese Patent Application No. 201410697434.1, filed on Nov. 26, 2014, which is hereby incorporated by reference in its entirety.

TECHNICAL FIELD

This application relates to the field of network technologies, and in particular, to a routing loop determining method and a device.

BACKGROUND

A layer 3 network is the third layer in an Open Systems Interconnection (OSI) model. A forwarding device, such as a router or a network switch, applied to a layer 3 network forwards a data packet according to a routing table. The routing table is established according to an Internet Protocol (IP) address.

In a layer 3 network, when a network topology changes, if a routing table is not updated, routing entries in routing tables may contradict each other, resulting in a routing loop. Because of the routing loop, a packet is cyclically transmitted among several fixed routers in the network and cannot reach a destination host.

SUMMARY

To resolve a problem of detecting a loop in a layer 3 network, embodiments of the present disclosure provide a routing loop determining method and a device. The technical solutions are as follows:

According to a first aspect, an embodiment of the present disclosure provides a routing loop determining method, where the method includes: acquiring, by a forwarding device in a layer 3 network, a first packet, where a time to live (TTL) value of the first packet is reduced to 0 by the forwarding device; acquiring, by the forwarding device, a second packet whose destination Internet Protocol IP address is the same as that of the first packet; recording, by the forwarding device, a feature of the second packet; forwarding, by the forwarding device, the second packet; and acquiring, by the forwarding device, a third packet according to the feature of the second packet, where a feature of the third packet is the same as that of the second packet, and determining that a routing loop exists.

In a first possible implementation manner of the first aspect, after the determining that a routing loop exists, the method further includes: performing, by the forwarding device, route tracking to obtain an address list, where a destination address of the route tracking is the destination IP address of the second packet, and each forwarding device address in the address list is an address, obtained according to the route tracking, of a forwarding device; and if the address list includes a forwarding device address that appears at least twice, determining, by the forwarding device, that a forwarding device indicated by the forwarding device address that appears at least twice is in the routing loop.

According to the first aspect or the first possible implementation manner of the first aspect, in a second possible implementation manner of the first aspect, the acquiring, by the forwarding device, a third packet according to the feature of the second packet, where a feature of the third packet is the same as that of the second packet, and determining that a routing loop exists includes: attempting, by the forwarding device, to acquire an $N^{th}$ packet according to the feature of the second packet, where a feature of the $N^{th}$ packet is the same as that of the second packet, and N is a positive integer greater than 3; if the forwarding device acquires the $N^{th}$ packet, calculating all TTL differences, where all the TTL differences include a TTL difference between the third packet and the second packet and a TTL difference between the $N^{th}$ packet and an $(N-1)^{th}$ packet; detecting, by the forwarding device, whether equal TTL differences exist among all the calculated TTL differences; and if it is detected that equal TTL differences exist among all the TTL differences, determining, by the forwarding device, that the routing loop exists.

According to the first aspect or the first possible implementation manner of the first aspect or the second possible implementation manner of the first aspect, in a third possible implementation manner of the first aspect, the acquiring a second packet whose destination IP address is the same as that of the first packet includes: establishing, by the forwarding device, a first access control list (ACL), where a value of a destination address match item of the first ACL is the destination IP address of the first packet; and finding, by the forwarding device, a match from all received packets using the first ACL, to acquire the second packet whose destination IP address is the same as that of the first packet.

According to the first aspect or the first possible implementation manner of the first aspect or the second possible implementation manner of the first aspect or the third possible implementation manner of the first aspect, in a fourth possible implementation manner of the first aspect, the acquiring a third packet according to the feature of the second packet includes: acquiring, by the forwarding device, a first IP address, a second IP address, and a packet sequence number, where the first IP address is a source IP address of the second packet, the second IP address is the destination IP address of the second packet, and the packet sequence number is a sequence number of the second packet; establishing, by the forwarding device, a second ACL, where a value of a source address match item of the second ACL is the first IP address, a value of a destination address match item of the second ACL is the second IP address, and a value of a sequence number match item of the second ACL is the packet sequence number; and finding, by the forwarding device, a match from all the received packets using the second ACL, to acquire the third packet whose source IP address, destination IP address, and sequence number are all the same as those of the second packet.

According to a second aspect, an embodiment of the present disclosure provides a forwarding device, applied to a layer 3 network, where the forwarding device includes: a first acquiring module configured to acquire a first packet, where a time to live TTL value of the first packet is reduced to 0 by the forwarding device; a second acquiring module configured to acquire a second packet whose destination Internet Protocol IP address is the same as that of the first packet acquired by the first acquiring module; a feature recording module configured to record a feature of the second packet acquired by the second acquiring module; a packet forwarding module configured to forward the second packet; and a loop determining module configured to acquire a third packet according to the feature, recorded by the feature recording module, of the second packet, where a feature of the third packet is the same as that of the second packet, and determine that a routing loop exists.

In a first possible implementation manner of the second aspect, the forwarding device further includes: a list acquiring module configured to: after the loop determining module determines that the routing loop exists, perform route tracking to obtain an address list, where a destination address of the route tracking is the destination IP address of the second packet, and each forwarding device address in the address list is an address, obtained according to the route tracking, of a forwarding device; and a device determining module configured to: when the address list acquired by the list acquiring module includes a forwarding device address that appears at least twice, determine that a forwarding device indicated by the forwarding device address that appears at least twice is in the routing loop.

According to the second aspect or the first possible implementation manner of the second aspect, in a second possible implementation manner of the second aspect, the loop determining module is configured to: attempt to acquire an $N^{th}$ packet according to the feature of the second packet, where a feature of the $N^{th}$ packet is the same as that of the second packet, and N is a positive integer greater than 3; when the $N^{th}$ packet is acquired, calculate all TTL differences, where all the TTL differences include a TTL difference between the third packet and the second packet and a TTL difference between the $N^{th}$ packet and an $(N-1)^{th}$ packet; detect whether equal TTL differences exist among all the calculated TTL differences; and when it is detected that equal TTL differences exist among all the TTL differences, determine that the routing loop exists.

According to the second aspect or the first possible implementation manner of the second aspect or the second possible implementation manner of the second aspect, in a third possible implementation manner of the second aspect, the second acquiring module is configured to establish a first access control list ACL, where a value of a destination address match item of the first ACL is the destination IP address of the first packet; and find a match from all received packets using the first ACL, to acquire the second packet whose destination IP address is the same as that of the first packet.

According to the second aspect or the first possible implementation manner of the second aspect or the second possible implementation manner of the second aspect or the third possible implementation manner of the second aspect, in a fourth possible implementation manner of the second aspect, the loop determining module is configured to acquire a first IP address, a second IP address, and a packet sequence number, where the first IP address is a source IP address of the second packet, the second IP address is the destination IP address of the second packet, and the packet sequence number is a sequence number of the second packet; establish a second ACL, where a value of a source address match item of the second ACL is the first IP address, a value of a destination address match item of the second ACL is the second IP address, and a value of a sequence number match item of the second ACL is the packet sequence number; and find a match from all the received packets using the second ACL, to acquire the third packet whose source IP address, destination IP address, and sequence number are all the same as those of the second packet.

Beneficial effects of the technical solutions provided by the embodiments of the present disclosure are as follows:

A forwarding device in a layer 3 network acquires a first packet, where a TTL value of the first packet is reduced to 0 by the forwarding device; acquires a second packet whose destination IP address is the same as that of the first packet; records a feature of the second packet; forwards the second packet; and acquires a third packet according to the feature of the second packet, where a feature of the third packet is the same as that of the second packet, and determines that a routing loop exists. Because the TTL value of the first packet is reduced to 0 by the forwarding device in the layer 3 network, the first packet cannot be forwarded to a destination host. In this case, the second packet whose destination address is the same as that of the first packet may be acquired. If the third packet whose feature is the same as that of the second packet is acquired after the second packet is forwarded, it is determined that the third packet is a packet that is acquired by the forwarding device again after the second packet is forwarded by the forwarding device. Generally, a packet does not pass through a same forwarding device multiple times. Therefore, it is determined that a routing loop exists between the forwarding device and the destination host, thereby resolving a problem that a loop in a layer 3 network cannot be detected and improving accuracy of sending a packet.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1A:
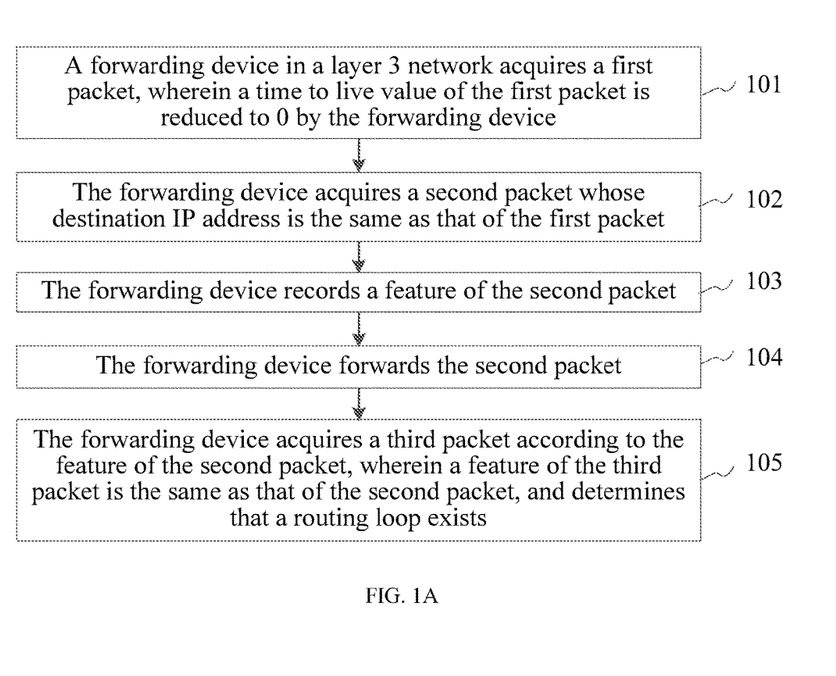
FIG. 1A is a method flowchart of a routing loop determining method according to an embodiment of the present disclosure.

Refer to FIG. 1A, which is a method flowchart of a routing loop determining method according to an embodiment of the present disclosure. The routing loop determining method may be applied to a forwarding device in a layer 3 network. The routing loop determining method includes:

Step 101: A forwarding device in a layer 3 network acquires a first packet, where a TTL value of the first packet is reduced to 0 by the forwarding device.

The forwarding device is a device configured to forward a packet in the layer 3 network, and may be a router, a layer 3 switch, or the like.

TTL is a life period of a packet in a network. After a packet is sent by a sender to a layer 3 network, a forwarding device in the layer 3 network processes the packet according to a TTL value. After receiving the packet, the forwarding device reduces the TTL value of the packet by 1; and if an obtained TTL value is greater than 0, the forwarding device forwards the packet; or if an obtained TTL value is equal to 0, the forwarding device discards the packet. The TTL value may be read from a TTL field in the packet.

In this embodiment, when the forwarding device receives the first packet, the TTL value of the first packet is 1, and the forwarding device reduces the TTL value by 1, so that the TTL value of the first packet is 0. In this case, the first packet is discarded by the forwarding device and cannot reach a destination host. This may be because an error occurs in a routing table in the forwarding device. Therefore, to determine whether an error occurs in the routing table in the forwarding device, the forwarding device may analyze the first packet.

The acquiring, by a forwarding device in a layer 3 network, a first packet includes: (1) establishing, by the forwarding device, an ACL, where a value of a TTL match item of the ACL is 0; and (2) finding, by the forwarding device, a match from all received packets using the ACL, to acquire the first packet whose TTL value is 0.

Step 102: The forwarding device acquires a second packet whose destination IP address is the same as that of the first packet.

When the TTL value of the first packet is reduced to 0 by the forwarding device, it may be because an error occurs in the routing table in the forwarding device and causes a routing loop, or it may be because an initial value of TTL is set incorrectly. Therefore, to determine whether a routing loop exists, the forwarding device acquires a second packet whose destination IP address is the same as that of the first packet and TTL is greater than 0, so as to find through analysis whether a routing loop exists between the forwarding device and the destination host. The routing loop refers to a phenomenon in which when a network topology structure changes but a corresponding routing table is not updated, routing entries in routing tables contradict each other and therefore a packet is cyclically transmitted among several fixed forwarding devices in a network.

The acquiring a second packet whose destination IP address is the same as that of the first packet includes: (1) establishing, by the forwarding device, a first ACL, where a value of a destination address match item of the first ACL is the destination IP address of the first packet; and (2) finding, by the forwarding device, a match from all the received packets using the first ACL, to acquire the second packet whose destination IP address is the same as that of the first packet.

After the first ACL is established, each time the forwarding device receives a packet, the forwarding device detects, using the first ACL, whether a destination IP address of the packet is equal to the value of the destination address match item. If detecting that the destination IP address is equal to the value of the destination address match item, the forwarding device determines that the packet is the second packet. The destination IP address may be read from a Destination Address field in the packet.

Step 103: The forwarding device records a feature of the second packet.

The feature of the second packet includes at least a source IP address, the destination IP address, a sequence number, and a TTL value of the second packet. The feature of the second packet may also include a header checksum and/or a fragment offset. The source IP address may be read from a Source Address field in the packet. The sequence number may be read from an Identification field in the packet. The header checksum may be read from a Header Checksum field in the packet. The fragment offset may be read from a Fragment Offset field in the packet.

A sequence number is used for indicating a serial number of a packet sent between a sending host and a destination host. Sequence numbers of packets sent by a sending host to different destination hosts may be the same, and sequence numbers of packets sent by different sending hosts to a same destination host may also be the same. Therefore, to uniquely identify the second packet, not only the sequence number of the second packet needs to be recorded, but also a source IP address of the sending host and a destination IP address of the destination host need to be recorded.

Step 104: The forwarding device forwards the second packet.

When a TTL value obtained by reducing the TTL value of the second packet by 1 is not 0, the forwarding device forwards the second packet according to the destination IP address and a routing table.

Step 105: The forwarding device acquires a third packet according to the feature of the second packet, where a feature of the third packet is the same as that of the second packet, and determines that a routing loop exists.

After the second packet is forwarded by the forwarding device, the forwarding device attempts to acquire a packet whose feature is the same as that of the second packet, that is, the third packet. To determine whether features of the third packet and the second packet are the same, several features of the third packet may be extracted. If the extracted features of the third packet are the same as the recorded feature of the second packet, it indicates that the forwarding device acquires the same packet again. For example, a combination of a source IP address, a destination IP address, and a sequence number may be used as a feature of a packet, or a source IP address, a destination IP address, a sequence number, and a header checksum are used as features of a packet, or a source IP address, a destination IP address, a sequence number, and a fragment offset are used as features of a packet.

The acquiring a third packet according to the feature of the second packet includes: (1) acquiring, by the forwarding device, a first IP address, a second IP address, and a packet sequence number, where the first IP address is a source IP address of the second packet, the second IP address is the destination IP address of the second packet, and the packet sequence number is a sequence number of the second packet; (2) establishing, by the forwarding device, a second ACL, where a value of a source address match item of the second ACL is the first IP address, a value of a destination address match item of the second ACL is the second IP address, and a value of a sequence number match item of the second ACL is the packet sequence number; and (3) finding, by the forwarding device, a match from all the received packets using the second ACL, to acquire the third packet whose source IP address, destination IP address, and sequence number are all the same as those of the second packet.

After the second ACL is established, each time the forwarding device receives a packet, the forwarding device detects, using the second ACL, whether a source IP address of the packet is equal to the value of the source address match item, whether a destination IP address is equal to the value of the destination address match item, and whether a sequence number is equal to the value of the sequence number match item. If detecting that the source IP address, the destination IP address, and the sequence number are separately equal to the values of the respective match items, the forwarding device determines that the packet is the third packet.

Generally, a packet does not pass through a same forwarding device twice. Therefore, when the forwarding device acquires the third packet and features of the third packet and the second packet are the same, it can be basically determined that a routing loop exists. Certainly, a case in which a packet passes through a same forwarding device twice and no routing loop exists cannot be excluded completely. Therefore, to further determine whether a routing loop exists, multiple attempts may be made to acquire a packet whose feature is the same as that of the second packet for analysis.

The acquiring, by the forwarding device, a third packet according to the feature of the second packet, where a feature of the third packet is the same as that of the second packet, and determining that a routing loop exists includes: (1) attempting, by the forwarding device, to acquire an $N^{th}$ packet according to the feature of the second packet, where a feature of the $N^{th}$ packet is the same as that of the second packet, and N is a positive integer greater than 3; (2) if the forwarding device acquires the $N^{th}$ packet, calculating all TTL differences, where all the TTL differences include a TTL difference between the third packet and the second packet and a TTL difference between the $N^{th}$ packet and an $(N-1)^{th}$ packet; (3) detecting, by the forwarding device, whether equal TTL differences exist among all the calculated TTL differences; and (4) if it is detected that equal TTL differences exist among all the TTL differences, determining, by the forwarding device, that the routing loop exists.

After the $(N-1)^{th}$ packet is forwarded by the forwarding device, the forwarding device attempts to acquire a packet whose feature is the same as that of the second packet, that is, the $N^{th}$ packet, where N is a positive integer greater than 3. For example, when N is 4, the forwarding device forwards the third packet, and attempts to acquire a fourth packet whose feature is the same as that of the second packet; when N is 5, the forwarding device forwards the fourth packet, and attempts to acquire a fifth packet whose feature is the same as that of the second packet.

When only a single routing loop exists, because a quantity of forwarding devices in the routing loop is fixed, the TTL difference between the third packet and the second packet and the TTL difference between the $N^{th}$ packet and the $(N-1)^{th}$ packet are equal. For example, the forwarding device acquires that a TTL value of the second packet is 12, a TTL value of the third packet is 8, a TTL value of the fourth packet is 4, and a TTL value of the fifth packet is 0; performs calculation on the second packet and the third packet, to obtain a TTL difference being 4; performs calculation on the third packet and the fourth packet, to obtain a TTL difference being 4; and performs calculation on the fourth packet and the fifth packet, to obtain a TTL difference being 4. Because all the TTL differences are 4, the forwarding device determines that a routing loop whose size is 4 exists.

When a routing loop is nested inside another, because a packet is cyclically transmitted within a smallest routing loop and the forwarding device can acquire the packet again after the packet is forwarded by at least another forwarding device, the forwarding device determines that the forwarding device is in the smallest routing loop. Because a quantity of forwarding devices in the smallest routing loop is fixed, all the TTL differences between the $N^{th}$ packets and the $(N-1)^{th}$ packets have an equal TTL difference. The forwarding device may further determine, according to the TTL differences, whether a routing loop exists among forwarding devices, so as to improve accuracy of detecting a routing loop.

Optionally, after the determining that a routing loop exists, the method further includes: (1) performing, by the forwarding device, route tracking to obtain an address list, where a destination address of the route tracking is the destination IP address of the second packet, and each forwarding device address in the address list is an address, obtained according to the route tracking, of a forwarding device; and (2) if the address list includes a forwarding device address that appears at least twice, determining, by the forwarding device, that a forwarding device indicated by the forwarding device address that appears at least twice is in the routing loop.

After determining that a routing loop exists, the forwarding device may further determine forwarding devices on the routing loop, and then prompt a network administrator with the determined forwarding devices, and the network administrator may modify routing tables in these forwarding devices, so as to resolve a problem that a packet is transmitted in a routing loop, the packet cannot reach a destination host, and network resources are wasted, thereby improving accuracy of sending a packet and reducing network resources. The forwarding device may prompt a forwarding device address using many methods, which are not limited in this embodiment.

The forwarding device may initiate route tracking, and set a destination address of the route tracking to the destination IP address of the second packet. In this way, after forwarding the second packet, the forwarding device may acquire a forwarding device address of each forwarding device through which the second packet passes, and arrange the forwarding device addresses according to an acquiring order, to generate an address list. The route tracking may be implemented using a route tracking tool, which is not described in detail in this embodiment. The forwarding device address may be an ingress address of a forwarding device, that is, a next-hop IP address.

For example, after forwarding the second packet, a forwarding device A performs route tracking. Assuming that the second packet sequentially passes through a forwarding device B, a forwarding device C, the forwarding device A, the forwarding device B, the forwarding device C, and the forwarding device A, a generated address list is: an address of the forwarding device B, an address of the forwarding device C, an address of the forwarding device A, the address of the forwarding device B, the address of the forwarding device C, and the address of the forwarding device A.

The forwarding device may further analyze the generated address list to find a forwarding device address that appears at least twice in the address list, and determine that a forwarding device indicated by the forwarding device address that appears at least twice is a forwarding device in the routing loop.

For example, the address list generated by the forwarding device is: the address of the forwarding device B, the address of the forwarding device C, the address of the forwarding device A, the address of the forwarding device B, the address of the forwarding device C, and the address of the forwarding device A, and the forwarding device may determine that forwarding devices in the routing loop are the forwarding device B, the forwarding device C, and the forwarding device A.

If a routing loop is nested inside another, after a smallest routing loop is determined, the network administrator may remove the smallest routing loop, and continue to trigger the forwarding device to perform steps 101 to 103, so as to determine a smallest routing loop among existing routing loops, until all routing loops are removed.

This embodiment is described using an example in which a sending host sends a packet to a destination host. Refer to a schematic structural diagram of a routing loop shown in FIG. 1B. As can be learned from FIG. 1B, an address of the sending host is 191.168.0.1; egress addresses of routers R1, R2, R3, and R4 are respectively 192.168.1.1, 192.168.2.1, 192.168.3.1, and 192.168.4.1; ingress addresses of routers R1, R2, R3, and R4 are respectively 192.168.4.2, 192.168.1.2, 192.168.2.2, and 192.168.3.2; and an address of the destination host is 192.168.5.2.

Figure 1B:
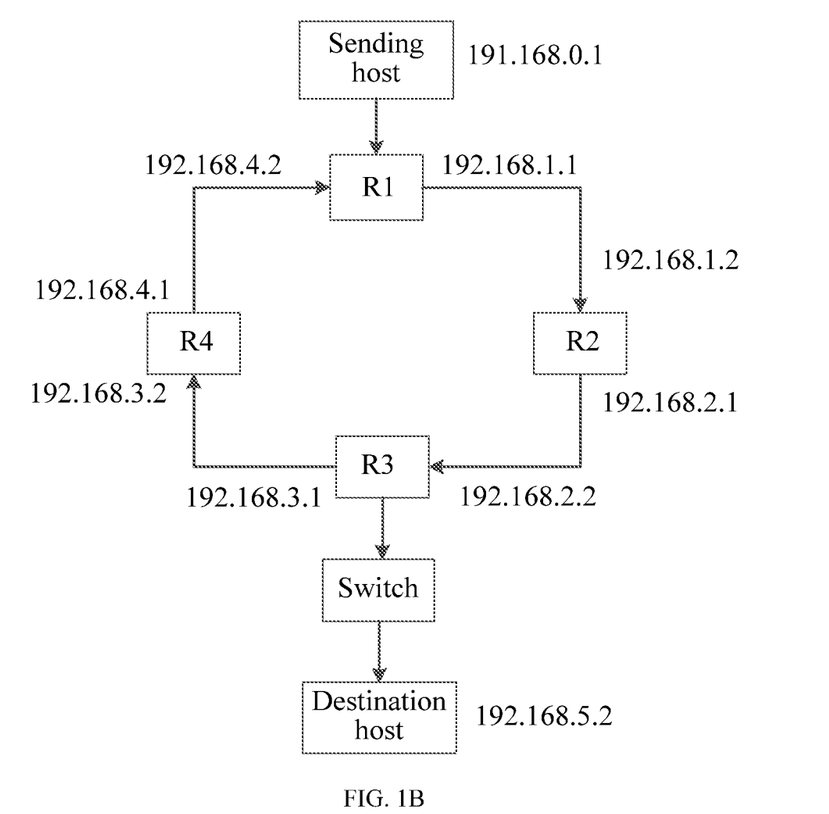
FIG. 1B is a schematic structural diagram of a routing loop according to an embodiment of the present disclosure.

It is assumed that routing tables in the forwarding devices are as follows:

| Router | Destination host | Next-hop router | Next-hop IP |
|---|---|---|---|
| R1 | 192.168.5.2 | R2 | 192.168.1.2 |
| R2 | 192.168.5.2 | R3 | 192.168.2.2 |
| R3 | 192.168.5.2 | R4 | 192.168.3.2 |
| R4 | 192.168.5.2 | R1 | 192.168.4.2 |

In this embodiment, R1, R2, R3, R4, and a switch are separately provided with an ACL. Although in FIG. 1B, the switch is not in the routing loop, a routing loop in which a next hop of the switch is R4 may exist. Therefore, the switch needs to be provided with an ACL. Values of TTL match items of the ACLs are 0. R1 may acquire, using the ACL, a first packet whose TTL value is reduced to 0 by R1.

Assuming that R1 acquires the first packet using the ACL, R1 records a destination IP address being 192.168.5.2 of the first packet, sets a value of a destination address match item to the destination IP address being 192.168.5.2 of the first packet. R1 acquires, using the first ACL, a second packet whose destination IP address is 192.168.5.2.

After acquiring the second packet using the first ACL, R1 records a feature of the second packet and forwards the second packet. The feature of the second packet includes at least the source IP address, the destination IP address, and the sequence number. R1 records a source IP address being 191.168.0.1, a destination IP address being 192.168.5.2, and a packet sequence number of the second packet, sets a value of a source address match item of a second ACL to the source IP address being 191.168.0.1 of the second packet, sets a value of a destination address match item to the destination IP address being 192.168.5.2 of the second packet, and sets a value of a packet sequence number match item to the sequence number of the second packet. R1 acquires, using the second ACL, a third packet whose source IP address is 191.168.0.1, destination IP address is 192.168.5.2, and packet sequence number is the sequence number.

If R1 acquires the third packet and an $N^{th}$ (N>3) packet and features of the third packet and the $N^{th}$ packet are separately the same as the feature of the second packet, R1 calculates a TTL difference between the third packet and the second packet and a TTL difference between the $N^{th}$ packet and an $(N-1)^{th}$ packet, detects whether equal TTL differences exist among all calculated TTL differences, and determines that a routing loop exists if it is detected that equal TTL differences exist among all the calculated TTL differences. For example, TTL values acquired by R1 are 16, 12, 8, and 4, and calculated differences between the TTL values are all 4, that is, all the TTL differences are equal. Therefore, it is determined that a routing loop exists.

R1 performs route tracking, to acquire ingress addresses of routers through which the second packet passes from R1 to the destination host, and generates an address list. The address list in this embodiment is shown in the following table:

| | |
|---|---|
| 1 | 192.168.1.2 |
| 2 | 192.168.2.2 |
| 3 | 192.168.3.2 |
| 4 | 192.168.4.2 |
| 5 | 192.168.1.2 |
| 6 | 192.168.2.2 |
| 7 | 192.168.3.2 |
| 8 | 192.168.4.2 |
| ... | ... |

It can be found that ingress addresses of four routers that appear twice between R1 and the destination host are 192.168.1.2, 192.168.2.2, 192.168.3.2, and 192.168.4.2. R1 determines that R1, R2, R3, and R4 indicated by the ingress addresses of the four routers are routers in the routing loop. R1 may also notify, in a manner of an alarm, the network administrator of a message that R1, R2, R3, and R4 form a routing loop, and the network administrator sets routing tables of R1, R2, R3, and R4, to remove the routing loop.

In conclusion, according to the routing loop determining method provided in this embodiment of the present disclosure, a forwarding device in a layer 3 network acquires a first packet, where a TTL value of the first packet is reduced to 0 by the forwarding device; acquires a second packet whose destination IP address is the same as that of the first packet; records a feature of the second packet; forwards the second packet; and acquires a third packet according to the feature of the second packet, where a feature of the third packet is the same as that of the second packet, and determines that a routing loop exists. Because the TTL value of the first packet is reduced to 0 by the forwarding device in the layer 3 network, the first packet cannot be forwarded to a destination host. In this case, the second packet whose destination address is the same as that of the first packet may be acquired. If the third packet whose feature is the same as that of the second packet is acquired after the second packet is forwarded, it is determined that the third packet is a packet that is acquired by the forwarding device again after the second packet is forwarded by the forwarding device. Generally, a packet does not pass through a same forwarding device multiple times. Therefore, it is determined that a routing loop exists between the forwarding device and the destination host, thereby resolving a problem that a loop in a layer 3 network cannot be detected and improving accuracy of sending a packet.

An address list is obtained by performing route tracking, where a destination address of the route tracking is the destination IP address of the second packet, and each forwarding device address in the address list is an address, obtained according to the route tracking, of a forwarding device. If the address list includes a forwarding device address that appears at least twice, it is determined that a forwarding device indicated by the forwarding device address that appears at least twice is in the routing loop. Forwarding devices in the routing loop may be determined according to quantities of times that forwarding device addresses included in the address list appear, so that a network administrator can manage these forwarding devices, so as to resolve a problem that a packet is transmitted in a routing loop, the packet cannot reach a destination host, and network resources are wasted, thereby improving accuracy of sending a packet and reducing network resources.

Figure 2:
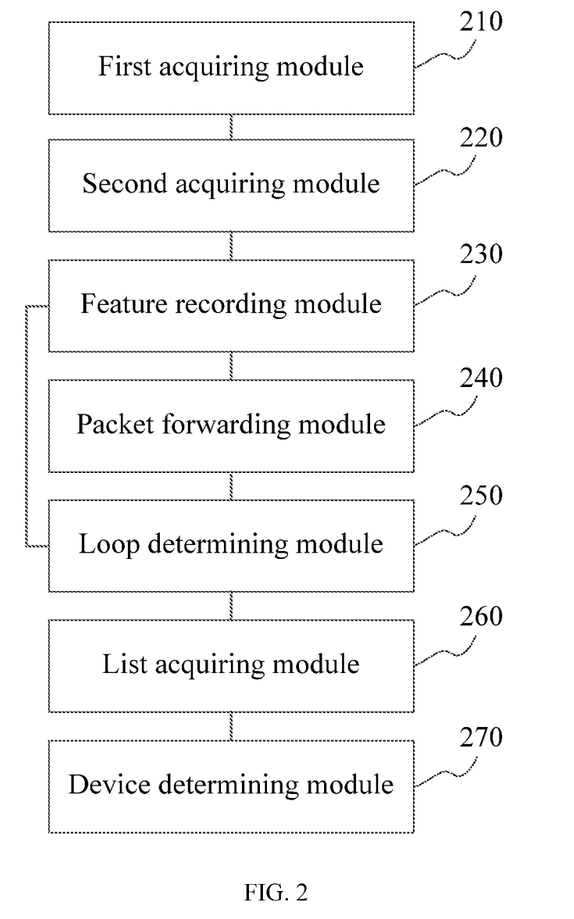
FIG. 2 is a functional block diagram of a forwarding device according to an embodiment of the present disclosure.

Refer to FIG. 2, which is a functional block diagram of a forwarding device according to an embodiment of the present disclosure. The forwarding device may be applied to a layer 3 network. The forwarding device includes: a first acquiring module 210 configured to acquire a first packet, where a TTL value of the first packet is reduced to 0 by the forwarding device; a second acquiring module 220 configured to acquire a second packet whose destination IP address is the same as that of the first packet acquired by the first acquiring module 210; a feature recording module 230 configured to record a feature of the second packet acquired by the second acquiring module 220; a packet forwarding module 240 configured to forward the second packet; and a loop determining module 250 configured to acquire a third packet according to the feature, recorded by the feature recording module 230, of the second packet, where a feature of the third packet is the same as that of the second packet, and determine that a routing loop exists.

Optionally, the forwarding device further includes: a list acquiring module 260 configured to: after the loop determining module 250 determines that the routing loop exists, perform route tracking to obtain an address list, where a destination address of the route tracking is the destination IP address of the second packet, and each forwarding device address in the address list is an address, obtained according to the route tracking, of a forwarding device; and a device determining module 270 configured to: when the address list acquired by the list acquiring module 260 includes a forwarding device address that appears at least twice, determine that a forwarding device indicated by the forwarding device address that appears at least twice is in the routing loop.

Optionally, the loop determining module 250 is configured to: attempt to acquire an $N^{th}$ packet according to the feature of the second packet, where a feature of the $N^{th}$ packet is the same as that of the second packet, and N is a positive integer greater than 3; when the $N^{th}$ packet is acquired, calculate all TTL differences, where all the TTL differences include a TTL difference between the third packet and the second packet and a TTL difference between the $N^{th}$ packet and an $(N-1)^{th}$ packet; detect whether equal TTL differences exist among all the calculated TTL differences; and when it is detected that equal TTL differences exist among all the TTL differences, determine that the routing loop exists.

Optionally, the second acquiring module 220 is specifically configured to establish a first ACL, where a value of a destination address match item of the first ACL is the destination IP address of the first packet; and find a match from all received packets using the first ACL, to acquire the second packet whose destination IP address is the same as that of the first packet.

Optionally, the loop determining module 250 is specifically configured to acquire a first IP address, a second IP address, and a packet sequence number, where the first IP address is a source IP address of the second packet, the second IP address is the destination IP address of the second packet, and the packet sequence number is a sequence number of the second packet; establish a second ACL, where a value of a source address match item of the second ACL is the first IP address, a value of a destination address match item of the second ACL is the second IP address, and a value of a sequence number match item of the second ACL is the packet sequence number; and find a match from all the received packets using the second ACL, to acquire the third packet whose source IP address, destination IP address, and sequence number are all the same as those of the second packet.

In conclusion, according to the forwarding device provided in this embodiment of the present disclosure, a forwarding device in a layer 3 network acquires a first packet, where a TTL value of the first packet is reduced to 0 by the forwarding device; acquires a second packet whose destination IP address is the same as that of the first packet; records a feature of the second packet; forwards the second packet; and acquires a third packet according to the feature of the second packet, where a feature of the third packet is the same as that of the second packet, and determines that a routing loop exists. Because the TTL value of the first packet is reduced to 0 by the forwarding device in the layer 3 network, the first packet cannot be forwarded to a destination host. In this case, the second packet whose destination address is the same as that of the first packet may be acquired. If the third packet whose feature is the same as that of the second packet is acquired after the second packet is forwarded, it is determined that the third packet is a packet that is acquired by the forwarding device again after the second packet is forwarded by the forwarding device. Generally, a packet does not pass through a same forwarding device multiple times. Therefore, it is determined that a routing loop exists between the forwarding device and the destination host, thereby resolving a problem that a loop in a layer 3 network cannot be detected and improving accuracy of sending a packet.

An address list is obtained by performing route tracking, where a destination address of the route tracking is the destination IP address of the second packet, and each forwarding device address in the address list is an address, obtained according to the route tracking, of a forwarding device. If the address list includes a forwarding device address that appears at least twice, it is determined that a forwarding device indicated by the forwarding device address that appears at least twice is in the routing loop. Forwarding devices in the routing loop may be determined according to quantities of times that forwarding device addresses included in the address list appear, so that a network administrator can manage these forwarding devices, so as to resolve a problem that a packet is transmitted in a routing loop, the packet cannot reach a destination host, and network resources are wasted, thereby improving accuracy of sending a packet and reducing network resources.

Figure 3:
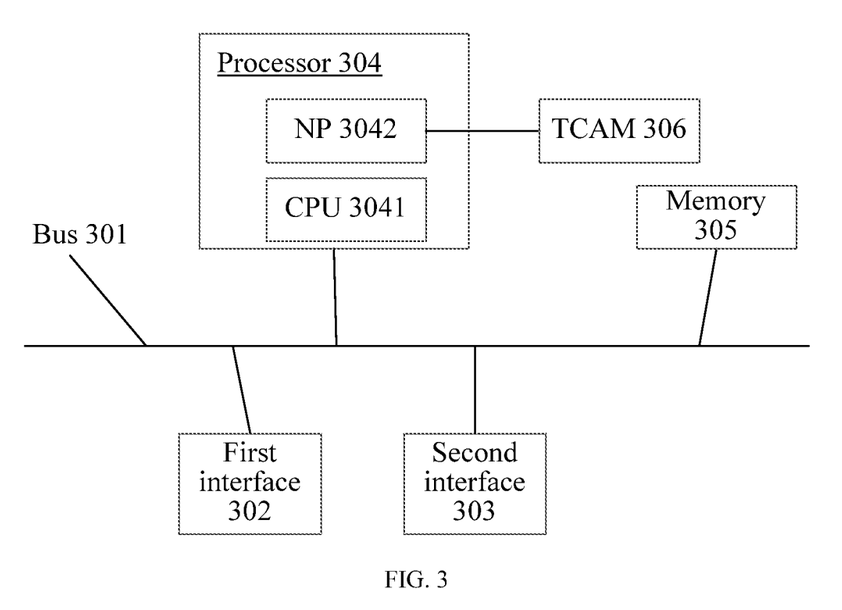
FIG. 3 is a structural block diagram of a forwarding device according to another embodiment of the present disclosure.

Refer to FIG. 3, which is a structural block diagram of a forwarding device according to an embodiment of the present disclosure. The forwarding device may be applied to a layer 3 network. The forwarding device includes: a bus 301, and a first interface 302, a second interface 303, and a processor 304 that are separately connected to the bus 301. the first interface 302 is configured to acquire a first packet, where a TTL value of the first packet is reduced to 0; and acquire a second packet whose destination IP address is the same as that of the first packet, where the processor 304 is configured to record a feature of the second packet received by the first interface 302; and the second interface 303 is configured to forward the second packet received by the first interface 302, where the first interface 302 is further configured to acquire a third packet according to the feature, recorded by the processor 304, of the second packet, where a feature of the third packet is the same as that of the second packet, and determine that a routing loop exists.

Optionally, the processor 304 is further configured to perform route tracking to obtain an address list, where a destination address of the route tracking is the destination IP address of the second packet, and each forwarding device address in the address list is an address, obtained according to the route tracking, of a forwarding device. If the address list includes a forwarding device address that appears at least twice, the forwarding device determines that a forwarding device indicated by the forwarding device address that appears at least twice is in the routing loop.

Optionally, the first interface 302 is further configured to attempt to acquire an $N^{th}$ packet according to the feature of the second packet, where a feature of the $N^{th}$ packet is the same as that of the second packet, and N is a positive integer greater than 3; and the processor 304 is further configured to: when the first interface 302 acquires the $N^{th}$ packet, calculate all TTL differences, where all the TTL differences include a TTL difference between the third packet and the second packet and a TTL difference between the $N^{th}$ packet and an $(N-1)^{th}$ packet; detect whether equal TTL differences exist among all the calculated TTL differences; and when it is detected that equal TTL differences exist among all the TTL differences, determine that the routing loop exists.

Optionally, the processor 304 is configured to establish a first ACL, where a value of a destination address match item of the first ACL is the destination IP address of the first packet; and the first interface 302 is configured to find a match from all received packets using the first ACL established by the processor 304, to acquire the second packet whose destination IP address is the same as that of the first packet.

Optionally, the processor 304 is configured to acquire a first IP address, a second IP address, and a packet sequence number, where the first IP address is a source IP address of the second packet, the second IP address is the destination IP address of the second packet, and the packet sequence number is a sequence number of the second packet; and establish a second ACL, where a value of a source address match item of the second ACL is the first IP address, a value of a destination address match item of the second ACL is the second IP address, and a value of a sequence number match item of the second ACL is the packet sequence number; and the first interface 302 is specifically configured to find a match from all the received packets using the second ACL, to acquire the third packet whose source IP address, destination IP address, and sequence number are all the same as those of the second packet.

In a first possible implementation manner, the processor 304 is implemented by a central processing unit (CPU) 3041. When the CPU 3041 has a storage function, the CPU 3041 may store and execute several instructions for implementing the foregoing routing loop determining method. When the CPU 3041 does not have a storage function, the forwarding device further includes a memory 305, where the memory 305 may store several instructions for implementing the foregoing routing loop determining method, and the CPU 3041 executes the several instructions.

In a second possible implementation manner, the processor 304 is implemented by a programmable network processor (NP) 3042. When the NP 3042 has a storage function, the NP 3042 may store and execute the several instructions for implementing the foregoing routing loop determining method. When the NP 3042 does not have a storage function, the forwarding device further includes a memory 305, where the memory 305 may store the several instructions for implementing the foregoing routing loop determining method, and the NP 3042 executes the several instructions. Alternatively, the forwarding device further includes a ternary content-addressable memory (TCAM) 306, where the TCAM 306 may store the several instructions for implementing the foregoing routing loop determining method, and the NP 3042 executes the several instructions. The TCAM 306 may store the first ACL and the second ACL, and the TCAM 306 is directly connected to the NP 3042.

In a third possible implementation manner, the processor 304 may be implemented by a CPU 3041 and an NP 3042 at the same time. When at least one of the CPU 3041 and NP 3042 has a storage function, the CPU 3041 and/or the NP 3042 may execute the several instructions for implementing the foregoing routing loop determining method. When neither of the CPU 3041 and the NP 3042 has a storage function, the forwarding device further includes at least one of a memory 305 and a TCAM 306 configured to store the several instructions for implementing the foregoing routing loop determining method, and the CPU 3041 and/or the NP 3042 may execute the several instructions. The NP 3042 is directly connected to the TCAM 306.

In conclusion, according to the forwarding device provided in this embodiment of the present disclosure, a forwarding device in a layer 3 network acquires a first packet, where a TTL value of the first packet is reduced to 0 by the forwarding device; acquires a second packet whose destination IP address is the same as that of the first packet; records a feature of the second packet; forwards the second packet; and acquires a third packet according to the feature of the second packet, where a feature of the third packet is the same as that of the second packet, and determines that a routing loop exists. Because the TTL value of the first packet is reduced to 0 by the forwarding device in the layer 3 network, the first packet cannot be forwarded to a destination host. In this case, the second packet whose destination address is the same as that of the first packet may be acquired. If the third packet whose feature is the same as that of the second packet is acquired after the second packet is forwarded, it is determined that the third packet is a packet that is acquired by the forwarding device again after the second packet is forwarded by the forwarding device. Generally, a packet does not pass through a same forwarding device multiple times. Therefore, it is determined that a routing loop exists between the forwarding device and the destination host, thereby resolving a problem that a loop in a layer 3 network cannot be detected and improving accuracy of sending a packet.

In addition, an address list is obtained by performing route tracking, where a destination address of the route tracking is the destination IP address of the second packet, and each forwarding device address in the address list is an address, obtained according to the route tracking, of a forwarding device. If the address list includes a forwarding device address that appears at least twice, it is determined that a forwarding device indicated by the forwarding device address that appears at least twice is in the routing loop. Forwarding devices in the routing loop may be determined according to quantities of times that forwarding device addresses included in the address list appear, so that a network administrator can manage these forwarding devices, so as to resolve a problem that a packet is transmitted in a routing loop, the packet cannot reach a destination host, and network resources are wasted, thereby improving accuracy of sending a packet and reducing network resources.

When the forwarding device provided in the foregoing embodiment determines a routing loop, the division of the foregoing functional modules is described only for exemplary purposes. In actual applications, the foregoing functions may be allocated to different functional modules according to needs, that is, the internal structure of the forwarding device is divided to different functional modules, to complete all or some of the above described functions. In addition, the forwarding device provided in the foregoing embodiment belongs to the same idea as the embodiment of the routing loop determining method. Refer to the method embodiment for details of a specific implementation process, which is not described repeatedly herein.

The sequence numbers of the foregoing embodiments of the present disclosure are merely for illustrative purposes, and are not intended to indicate priorities of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

Persons of ordinary skill in the art may understand that all or a part of the steps in each of the foregoing method of the embodiments may be implemented by a program instructing a processor. The foregoing program may be stored in a computer readable storage medium. The storage medium may be a non-transitory medium, and may be a random-access memory (RAM), read-only memory (ROM), a flash memory, a hard disk drive (HDD), a solid state drive (SSD), a magnetic tape, a floppy disk, an optical disc, or any combination thereof.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A routing loop determining method, wherein the method comprises:
   recording, by a forwarding device in a layer 3 network, a destination Internet Protocol (IP) address of a first packet when a time to live (TTL) value of the first packet is 1 and is reduced to 0 by the forwarding device;
   discarding, by the forwarding device, the first packet;
   acquiring, by the forwarding device, a second packet whose destination IP address is the same as that of the first packet;
   recording, by the forwarding device, a feature of the second packet, wherein the feature of the second packet comprises a source IP address, the destination IP address, and a sequence number of the second packet;
   forwarding, by the forwarding device, the second packet based on the destination IP address and a routing table when a TTL value obtained by reducing a TTL value of the second packet by 1 is greater than 0;
   acquiring, by the forwarding device, a third packet according to the feature of the second packet, wherein a feature of the third packet is the same as the recorded feature of the second packet, wherein a source IP address of the third packet is the same as the source IP address of the second packet, wherein a destination IP address of the third packet is the same as the destination IP address of the second packet, and wherein a sequence number of the third packet is the same as the sequence number of the second packet; and
   determining that a routing loop exists in response to acquiring the third packet.

2. The method according to claim 1, wherein after determining that the routing loop exists, the method further comprises:
   performing, by the forwarding device, route tracking to obtain an address list comprising another forwarding device address for another forwarding device, wherein a destination address of the route tracking is the destination IP address of the second packet; and
   determining, by the forwarding device, that the other forwarding device is a looping forwarding device when the other forwarding device address appears at least twice in the address list.

3. The method according to claim 1, wherein acquiring, by the forwarding device, the third packet according to the feature of the second packet and determining that a routing loop exists comprises:
   attempting, by the forwarding device, to acquire an Nth packet according to the feature of the second packet, wherein a feature of the Nth packet is the same as that of the second packet, and N is a positive integer greater than 3;
   calculating a plurality of TTL differences when the forwarding device acquires the Nth packet, wherein the TTL differences comprise a TTL difference between the third packet and the second packet and a TTL difference between the Nth packet and an (N−1)th packet;
   detecting, by the forwarding device, whether equal TTL differences exist among all of the calculated TTL differences; and determining, by the forwarding device, that the routing loop exists when equal TTL differences exist among all of the TTL differences.

4. The method according to claim 1, wherein acquiring the second packet whose destination IP address is the same as that of the first packet comprises:
   establishing, by the forwarding device, a first access control list (ACL), wherein a value of a destination address match item of the first ACL is the destination IP address of the first packet; and
   finding, by the forwarding device, a match from all received packets using the first ACL, to acquire the second packet whose destination IP address is the same as that of the first packet.

5. The method according to claim 4, wherein acquiring the third packet according to the feature of the second packet comprises:
   acquiring, by the forwarding device, a first IP address, a second IP address, and a packet sequence number, wherein the first IP address is a source IP address of the second packet, wherein the second IP address is the destination IP address of the second packet, and wherein the packet sequence number is a sequence number of the second packet;
   establishing, by the forwarding device, a second ACL, wherein a value of a source address match item of the second ACL is the first IP address, wherein a value of a destination address match item of the second ACL is the second IP address, and wherein a value of a sequence number match item of the second ACL is the packet sequence number; and
   finding, by the forwarding device, a match from all received packets using the second ACL, to acquire the third packet whose source IP address, destination IP address, and sequence number are all the same as those of the second packet.

6. A forwarding device, applied to a layer 3 network, wherein the forwarding device comprises:
   a network interface; and
   at least one processor coupled to the network interface, wherein the at least one processor is configured to:
   record a destination Internet Protocol (IP) address of a first packet using the network interface when a time to live (TTL) value of the first packet is 1 and is reduced to 0 by the forwarding device;
   discard the first packet;
   acquire a second packet whose destination IP address is the same as that of the first packet using the network interface;
   record a feature of the second packet, wherein the feature of the second packet comprises a source IP address, the destination IP address, and a sequence number of the second packet;
   forward the second packet using the network interface based on the destination IP address and a routing table when a TTL value obtained by reducing a TTL value of the second packet by 1 is greater than 0;
   acquire a third packet, using the network interface and according to the feature of the second packet, wherein a feature of the third packet is the same as the recorded feature of the second packet, wherein a source IP address of the third packet is the same as the source IP address of the second packet, wherein a destination IP address of the third packet is the same as the destination IP address of the second packet, and wherein a sequence number of the third packet is the same as the sequence number of the second packet; and
   determine that a routing loop exists in response to acquiring the third packet.

7. The forwarding device according to claim 6, wherein the processor is further configured to:
   perform route tracking to obtain an address list comprising another forwarding device address for another forwarding device after determining that the routing loop exists, wherein a destination address of the route tracking is the destination IP address of the second packet; and
   determine that the other forwarding device is a looping forwarding device when the other forwarding device address appears at least twice in the address list.

8. The forwarding device according to claim 6, wherein the processor is further configured to:
   attempt to acquire an Nth packet according to the feature of the second packet, wherein a feature of the Nth packet is the same as that of the second packet, and wherein N is a positive integer greater than 3;
   calculate a plurality of TTL differences when the Nth packet is acquired, wherein the TTL differences comprise a TTL difference between the third packet and the second packet and a TTL difference between the Nth packet and an (N−1)th packet;
   detect whether equal TTL differences exist among all of the calculated TTL differences; and
   determine that the routing loop exists when equal TTL differences exist among all of the TTL differences.

9. The forwarding device according to claim 6, wherein the processor is further configured to:
   establish a first access control list (ACL), wherein a value of a destination address match item of the first ACL is the destination IP address of the first packet; and
   find a match from all received packets using the first ACL, to acquire the second packet whose destination IP address is the same as that of the first packet.

10. The forwarding device according to claim 9, wherein the processor is further configured to:
    acquire a first IP address, a second IP address, and a packet sequence number, wherein the first IP address is a source IP address of the second packet, the second IP address is the destination IP address of the second packet, and wherein the packet sequence number is a sequence number of the second packet;
    establish a second ACL, wherein a value of a source address match item of the second ACL is the first IP address, wherein a value of a destination address match item of the second ACL is the second IP address, and wherein a value of a sequence number match item of the second ACL is the packet sequence number; and
    find a match from all received packets using the second ACL, to acquire the third packet whose source IP address, destination IP address, and sequence number are all the same as those of the second packet.

11. A non-transitory computer-readable storage medium comprising instructions which, when executed by a computer, cause the computer to:
    record a destination Internet Protocol (IP) address of a first packet when a time to live (TTL) value of the first packet is 1 and is reduced to 0;
    discard the first packet;
    acquire a second packet whose destination IP address is the same as that of the first packet;
    record a feature of the second packet, wherein the feature of the second packet comprises a source IP address, a destination IP address, and a sequence number of the second packet;

forward the second packet based on the destination IP address and a routing table when a TTL value obtained by reducing a TTL value of the second packet by 1 is greater than 0;

acquire a third packet according to the feature of the second packet, wherein a feature of the third packet is the same as the recorded feature of the second packet, wherein a source IP address of the third packet is the same as the source IP address of the second packet, wherein a destination IP address of the third packet is the same as the destination IP address of the second packet, and wherein a sequence number of the third packet is the same as the sequence number of the second packet; and determine that a routing loop exists in response to acquiring the third packet.

12. The non-transitory computer-readable storage medium according to claim 11, wherein the instructions further cause the computer to:

perform route tracking to obtain an address list comprising another forwarding device address for another forwarding device after determining that the routing loop exists, wherein a destination address of the route tracking is the destination IP address of the second packet; and determine that the other forwarding device is a looping forwarding device when the other forwarding device address appears at least twice in the address list.

13. The non-transitory computer-readable storage medium according to claim 11, wherein the instructions further cause the computer to:

attempt to acquire an Nth packet according to the feature of the second packet, wherein a feature of the Nth packet is the same as that of the second packet, and wherein N is a positive integer greater than 3;

calculate a plurality of TTL differences when the Nth packet is acquired, wherein the TTL differences comprise a difference between the third packet and the second packet and a TTL difference between the Nth packet and an (N−1)th packet;

detect whether equal TTL differences exist among all of the calculated TTL differences; and determine that the routing loop exists when equal TTL, differences exist among all of the TTL differences.

* * * * *

UNITED STATES PATENT AND TRADEMARK OFFICE
CERTIFICATE OF CORRECTION

PATENT NO. : 10,003,524 B2
APPLICATION NO. : 14/949466
DATED : June 19, 2018
INVENTOR(S) : Bin Li Page 1 of 1

It is certified that error appears in the above-identified patent and that said Letters Patent is hereby corrected as shown below:

On the Title Page

Item (30), Line 1: "201410697434" should be "201410697434.1"

In the Claims

Column 20, Line 16: insert --TTL-- before "difference"

Signed and Sealed this
Twenty-eighth Day of May, 2019

Andrei Iancu
*Director of the United States Patent and Trademark Office*